United States Patent
Nagarajan et al.

(10) Patent No.: US 9,829,947 B1
(45) Date of Patent: Nov. 28, 2017

(54) SELECTING AND SERVING A CONTENT ITEM BASED ON DEVICE STATE DATA OF A DEVICE

(71) Applicant: Google Inc., Mountain View, CA (US)

(72) Inventors: Hareesh Nagarajan, Sunnyvale, CA (US); Surojit Chatterjee, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/245,302

(22) Filed: Apr. 4, 2014

(51) Int. Cl.
*G06F 9/46* (2006.01)
*G06F 1/28* (2006.01)

(52) U.S. Cl.
CPC ..................... *G06F 1/28* (2013.01)

(58) Field of Classification Search
CPC ..................... G06F 1/26; G06F 1/28
See application file for complete search history.

(56) References Cited

U.S. PATENT DOCUMENTS

| | | | | |
|---|---|---|---|---|
| 2008/0298287 A1* | 12/2008 | Martinez-Perez | | H04W 72/1247 370/311 |
| 2010/0255877 A1* | 10/2010 | Sarma | ................. | H04L 12/5895 455/557 |
| 2012/0072042 A1* | 3/2012 | Moriai | ................... | H02J 7/0013 700/297 |
| 2012/0297218 A1* | 11/2012 | Hsiu | ..................... | G06F 1/3265 713/320 |
| 2013/0166083 A1* | 6/2013 | Guo | ........................ | H04L 67/18 700/291 |
| 2013/0304583 A1* | 11/2013 | Han | .................... | G06Q 30/0267 705/14.64 |
| 2014/0006809 A1* | 1/2014 | Udeshi | .................. | G06F 9/5094 713/300 |
| 2014/0095670 A1* | 4/2014 | Ozgur | ............... | H04W 52/0258 709/219 |
| 2014/0188932 A1* | 7/2014 | Kalita | .................... | G06Q 10/10 707/770 |
| 2014/0282587 A1* | 9/2014 | Argon | ................... | G06F 9/5027 718/104 |
| 2015/0156143 A1* | 6/2015 | Chopde | ................... | H04L 51/04 715/752 |

FOREIGN PATENT DOCUMENTS

EP 2 224 714 9/2010

* cited by examiner

*Primary Examiner* — Camquy Truong
(74) *Attorney, Agent, or Firm* — Foley & Lardner LLP; John D. Lanza

(57) ABSTRACT

Selection and serving of content items may include receiving data indicative of a status of an energy source of a device with a request for a content item. A first received content item may be associated with a first energy consumption level and a second received content item may be associated with a second energy consumption level. The accessed content items are responsive to the request for a content item. The first energy consumption level may be higher than the second energy consumption level. The first content item or the second content item may be selected based, at least in part, on the received data indicative of the status of the energy source of the device, and data to display the selected content item may be provided to the device.

17 Claims, 5 Drawing Sheets

SELECTING AND SERVING A CONTENT ITEM BASED ON DEVICE STATE DATA OF A DEVICE

BACKGROUND

In a networked environment, such as the Internet or other networks, first-party content providers can provide information for public presentation on resources, for instance web pages, documents, applications, and/or other resources. The first-party content can include text, video, and/or audio information provided by the first-party content providers via a resource server for presentation on a user device over the Internet. Additional third-party content can also be provided by third-party content providers for presentation on the user device together with the first-party content provided by the first-party content providers. Thus, a person viewing a resource can access the first-party content that is the subject of the resource, as well as the third-party content that may or may not be related to the subject matter of the resource.

SUMMARY

One implementation relates to a method for selecting and serving content items includes receiving data indicative of a status of an energy source of a device and a request for a content item. The method further includes accessing a first content item associated with a first energy consumption level and a second content item associated with a second energy consumption level responsive to the request for a content item. The first energy consumption level is higher than the second energy consumption level. The method additionally includes selecting the first content item or the second content item based, at least in part, on the received data indicative of the status of the energy source of the device, and providing data to display the selected content item.

Another implementation relates to a system configured to display a first content item on a device. The system includes one or more data processors; and a computer-readable storage device storing instructions that, when executed by the data processor, cause the data processor to perform certain operations. The operations include receiving a request for a content item and data indicative of a status of an energy source of the device and at least one of a signal strength or a charging state of the device. The operations further include determining, from among several candidate content items, a first content item and a second content item responsive to the request, the first content item being associated with a first energy consumption level, the second content item being associated with a second energy consumption level, and the first battery consumption level being higher than the second energy consumption level. The operations additionally include selecting the first content item or the second content item based, at least in part, on the data indicative of the status of an energy source and the at least one of the charging state or the signal strength, and providing data to display the selected content item.

Yet a further implementation relates to a non-transitory computer-readable storage medium having instructions thereon that cause one or more processors to perform several operations. The operations include receiving data indicative of a status of an energy source of a device and a request for a content item, and identifying several content items responsive to the request for a content item. The operations also include determining, for each of the several content items, a value based, at least in part, on a predictive model and the status of the energy source of the device. The operations may further include selecting a content item of the several content items based, at least in part, on the determined values for each of the several content items and providing data to display the selected content item.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
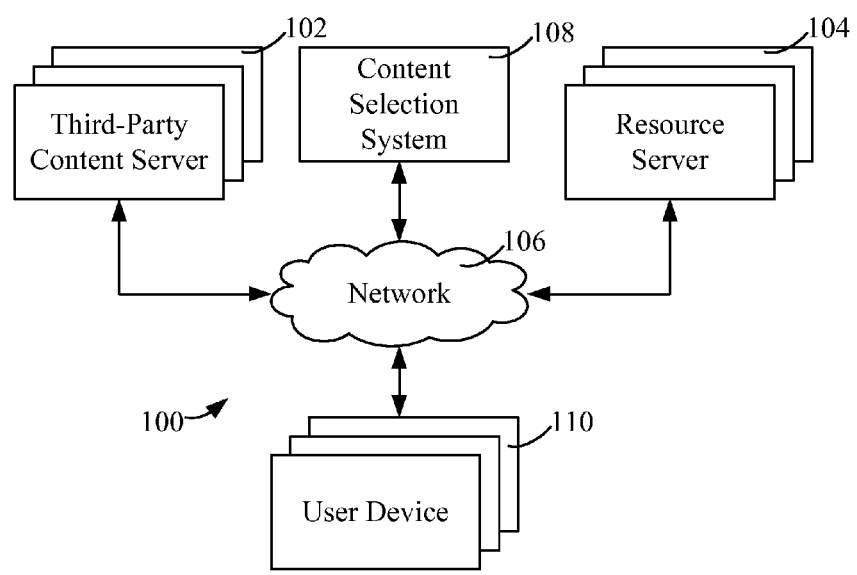
FIG. 1 is an overview depicting an implementation of a system of providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and embodiments of, methods, apparatuses, and systems for providing information on a computer network. The various concepts introduced above and discussed in greater detail below may be implemented in any of numerous ways, as the described concepts are not limited to any particular manner of implementation. Instances of specific implementations and applications are provided primarily for illustrative purposes.

A computing device (e.g., a user device) can view a resource, such as a web page, via the Internet by communicating with a server, such as a web page server, corresponding to that resource. The device may be a mobile device, in some implementations. The resource may include first-party content that is the subject of the resource from a first-party content provider, as well as additional third-party provided content, such as advertisements or other content. In one implementation, responsive to receiving a request to access a web page, a web page server and/or a user device can communicate with a data processing system, such as a content selection system, to request a content item to be presented with the requested web page. The content selection system can select a third-party content item and provide data to display the content item with the requested web page on a display of the user device, e.g., the time at which the content item is displayed. In some instances, the content item may be selected and served with a resource associated with a search query response. For instance, a search engine may return search results on a search results web page and may include third-party content items related to the search query in one or more content item slots of the search results web page.

The computing device (e.g., a user device) may also be used to view or execute an application, such as a mobile application. The application may include first-party content that is the subject of the application from a first-party content provider, as well as additional third-party provided content, such as advertisements or other content. In one implementation, responsive to use of the application, a web page server and/or a user device can communicate with a data processing system, such as a content selection system, to request a content item to be presented with the user interface of the application and/or otherwise. The content selection system can select a third-party content item and provide data to display the content item with the application on a display of the user device.

In some implementations, an energy level may be determined for an energy source for the user device. In some instances, the energy level may correspond to a battery level for a battery of the user device, where the energy source corresponds to the battery. The status of the energy source, in some implementations, corresponds to the level of energy in the energy source, e.g., the battery level. The battery level of the user device corresponds to the amount of charge stored by the battery. The lower the battery level, the less time before the user device will require recharging so as to increase the amount of charge. The rate at which the amount of charge declines may be correlated to a load placed on the battery of the user device. In other words, when more is demanded of the battery—for instance, when accessing some types of content on the user device that require more battery resources than accessing other types of content—the battery level decreases faster.

Furthermore, in some implementations, the user device may be used in certain environments corresponding to higher energy source consumption than other environments. For instance, a user device such as a mobile phone that is employed in an area of poor reception may drain significant amounts of energy from the energy source (e.g., a battery) in order to receive a signal from the cellular network associated with the mobile phone. The signal strength for the user device in a given location may vary. For instance, a mobile phone that is turned on aboard an airplane during a typical commercial flight without being set in an 'airplane mode' may quickly drain its battery because of spotty signal coverage at the cruising altitudes associated with commercial passenger flights.

In some implementations, when the battery level of the user device is reduced to a predetermined threshold or lower, the user may be prompted by the user device to recharge the battery. In some implementations, the user may recharge the battery while the user device is off or on. In some implementations, the user may use the user device while recharging the battery. Recharging may be accomplished in a variety of ways, e.g., connection to a wall charger, a car charger, a USB connection that draws power from another device, among others. Regardless, recharging requires the user device to be connected in some way to a source of power. Depending on the ease with which the power source can be established—that is, how readily available the power source and any necessary charging apparatuses are—and how long it will take to regain sufficient charge in the battery, a user may be inconvenienced by needing to recharge the battery of the user device.

Furthermore, in addition to potentially inconveniencing the user, a low battery level may hinder the user from accessing content that the user would otherwise be receptive to viewing. Additionally, in some instances, the user may or may not be aware of the likely impact of viewing certain content on the user device or accessing the user device from certain locations, and may make a decision not to view certain content out of concern for preserving battery life. Some users may make conscientious decisions so as to avoid depleting their batteries regardless of the actual battery level of their devices, while other users may make conscientious decisions once their battery level is reduced to be a certain threshold or lower.

In some instances, the battery level can be ascertained based on data supplied by the user device, and a charging state of the user device can also be determined. The charging state of the device can indicate, for instance, that the user device is plugged into a charger and is actively charging, that the user device has been plugged into the charger and has completed charging, or is disconnected from a power source.

In some instances, there may be situations in which a content item should not be delivered to the user device because its expected battery consumption is high enough that a user is unlikely to be interested in engaging with the content item. For instance, if the battery level of the user device indicates that the user device has only a minimal amount of remaining battery life and requires charging, then the receptiveness of the user to a content item may be determined to be low. Accordingly, delivery of a content item may be delayed or precluded until it is determined that the user is likely to be more receptive to the content item. Alternatively, a different type of content item with a lower expected battery consumption may be delivered to the user device because the user may be more receptive to content that depletes less of the remaining battery resources.

Further, in some implementations, the receptiveness of the user may reflect not only considerations relating to battery level, but also to other contextual factors such as location. For instance, if a battery level of the user device is waning, and a user is determined to be on a subway ride from an airport, the user may be much more interested in receiving low-battery-consumption content relating to local taxi services (e.g., an advertisement with a simple display for ordering a cab) than high-battery-consumption content with taxi listings or local news audiovisual content. Displaying content items—whether or not they are selected at least in part based on a battery level—when and where the user is more likely to be receptive to the content item facilitates interaction and engagement with such content, whereas displaying a content item in other circumstances may result in the user ignoring the content item or preventing the display of the content item.

In some instances, at least one of the battery level of the user device, the charging state of the user device, and the signal strength of the user device may be taken into account in selecting content to display to the user. Such content may be selected from a content repository. Further, any combination of information relating to the battery level, the charging state, and the signal strength may be coupled with other sensor and/or application information from the user device. Such information may be taken into account in determining whether to display content based on the battery level and/or other sensor and application information. In one instance, if the charging state of the user device indicates that the user device is actively charging, then content selection may be made without regard to the battery level and/or the signal strength.

In some instances, a device identifier may be determined for the user device. The device identifier may be a randomized number associated with the user device to identify the device during subsequent requests for resources and/or content items. In some instances, the device identifier may be configured to store and/or cause the user device to transmit information related to the user device to the content selection system and/or resource server (e.g., values of device state data, a web browser type, an operating system, historical resource requests, historical content item requests, etc.).

For situations in which the systems discussed here collect information about users, or may make use of information about users, the users may be provided with an opportunity to control whether programs or features may collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that certain information about the user is removed when generating parameters (e.g., demographic parameters). For instance, a user's identity may be treated so that no identifying information can be determined for the user, or a user's geographic location may be generalized where location information is obtained (such as to a city, ZIP code, or state level), so that a particular location of a user cannot be determined. Similarly, the users may be provided with an opportunity to control whether programs or features may collect certain information described herein (e.g., information about an energy level, a charging state, and a signal strength), or to control whether and/or how such information is used. Thus, users may have control over how information is collected about them and used by a content server.

A third-party content provider, when providing third-party content items for presentation with requested resources via the Internet or with an application, may utilize a content item management account to control or otherwise influence the selection and serving of the third-party content items. A third-party content provider may be offered a menu with different setting choices for a particular campaign. In some implementations, such a menu may be offered by a manager of the content item management account. The settings may include settings relating to battery level as well as to various types of campaign settings. In some implementations, the content item management account categorizes battery levels by comparing them to a predetermined threshold. The battery level may be bucketized by the content item management account into categories (such as "Very Low Battery," "Low Battery," or "High Battery" categories) which are displayed to the third-party content provider. Other settings that the third-party content provider may select from include which devices to display the third-party content on, as well as geographic locations in which to offer the third-party content and particular networks to utilize. In some implementations, such additional settings may be associated with device attributes such as network speed, capabilities, processor speed, available RAM, and available storage, among others.

In an implementation, for a particular campaign promoting an activity (such as mountain biking or scuba diving), a third-party content provider may choose a 'search and display' campaign type. In some implementations, a third-party content provider may elect to offer third-party content of a 'click to download' type only when the battery level of a particular user device is at a high battery level. Conversely, when the battery level is low, the third-party content provider may elect to offer third-party content including text and links to additional content. In this manner, the third-party content being offered may correspond to the battery level of the user device so as to avoid inconveniencing the user by depleting a remaining charge amount. For instance, if 'click to download' content is offered when the battery level is high, the user can engage with content of a high-resource consumption type (e.g., a video clip) and still have an appreciable amount of remaining battery life available. If basic, low-resource consumption types of content—such as simple text-based content—is offered when the battery level is low, a user may be more inclined to engage with such content without running the risk of depleting the relatively smaller reserve of remaining battery life before recharging is required. In some instances, the battery level may be taken into account by the third-party content selection system so as to preemptively eliminate third-party content consuming higher amounts of the battery level when the battery level is indicated to be low.

Furthermore, in some implementations, a third-party content provider may be able to specify keywords and corresponding bid values that are used in the selection of the third-party content items. Thus, in some implementations, the third-party content offered may be selected based at least in part on both the specified keywords and the battery level. In at least one implementation, data associated with at least one keyword, user behavior, location information, and the battery level for a user device may be inputted into a third-party content selection system to aid in the selection of third-party content with which the user may be likely to engage. In other implementations, the third-party content provider may be able to specify situations or states of a user device to be used in the selection and serving of third-party content items. In some instances, the third-party content offered may be selected based at least in part for a particular brand of content as well as the battery level. Further, if a particular brand is associated with a third-party content item of a higher battery consumption level and a third-party content item of a lower battery consumption level, the selected content item for the particular brand may be made in accordance with the battery level. If the battery level changes subsequently, the selection of content for the particular brand may be altered accordingly.

In some instances, one or more performance metrics for the third-party content items may be determined and indications of such performance metrics may be provided to the third-party content provider via a user interface for the content item management account. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), a conversion rate (e.g., a number of sales per impression), and/or other performance metrics may be used.

In some instances, a third-party content provider may have third-party content items that perform better based on a battery level of a user device, indicating a higher receptiveness of the user. For instance, battery levels of user devices may be correlated with clicks or other actions associated with one or more third-party content items. It should be understood that the battery levels used herein does not include personally-identifiable information. In one instance, response data indicating receptiveness, such as clicks, associated with the battery level may be used to determine and/or update one or more predictive models. The predictive models may output a value, such as a predicted CTR (pCTR), a predicted CVR (pCVR), etc., for content items based, at least in part, on received battery level data. The value may be used, at least in part, in the selection of a content item to be served to the user device.

In some implementations, a content selection predictive model may be determined using machine learning algorithms and/or other methods for determining the predictive model using the battery level data, signal strength data, and/or charging state data. When battery level data is received from a user device (e.g., as part of a content item request, associated with a content item request, etc.), the data may be used as an input for the model and the outputted value (e.g., pCTR, pCVR, etc.) for a content item may be used in the selection of a content item from several content items. Thus, the battery level data received from a user device may be used in the selection and serving of a content item, and determining whether to transmit the content item. Likewise, when the signal strength and/or charging state data is received from the user device, the data may be leveraged (separately or in conjunction with the battery level data) as an input for the model, and the outputted value (e.g., pCTR, pCVR, etc.) for a content item may be used in the selection of a content item.

In another implementation, content selection may be carried out based at least in part on a battery level of the user device using filtering techniques. For instance, several content items to be selected for display to the user may include a first set and a second set of content items. The first set of content items may be associated with higher battery consumption levels than the second set of content items. Accordingly, in some implementations, the several content items may be filtered to eliminate the first set of content items as candidates for selection to display to the user when the battery level of the user device is below a predetermined threshold. The candidates for selection are those content items in the second set, which respectively have lower battery consumption levels. Such filtering may allow for an increased likelihood of interaction and engagement with the selected content item by winnowing out the content towards which a user would be unlikely to be receptive given the low battery level of the user device.

Further, in some implementations, when a request for a content item is received, the battery level data and charging state indicators may be utilized in the selection of a content item in addition to, or in lieu of, other sensor data. Further, some implementations allow for determining whether and/or when to transmit the content item as well as, or instead of selection of the content item.

In some implementations, user engagement and repetitive battery level data (e.g., user engagement data associated with specific battery levels) may be determined from the device state history and utilized as input for a content selection predictive model. That is, if values of the battery level in the device state history recur, the recurring battery levels and data indicative of whether a content item was selected may be utilized to generate the predictive model. The output of the predictive model may be utilized in the selection and serving of a content item.

In some instances, content selection predictive models may be generated and used for each third-party content item, for groups or categories of third-party content items, for content items of different energy consumption levels for the same campaign, etc. For instance, a particular campaign may have a lower-consumption content item (e.g., a text banner), and a higher-consumption content item (a video clip), and the foregoing selection model may aid in selection of one such content item.

While the foregoing has provided an overview of a content selection model in the selection of content items based at least in part on the battery level of a user device, more specific implementations and systems to implement such a predictive model will now be described herein.

FIG. 1 is a block diagram of an implementation of a system 100 for providing information via at least one computer network such as the network 106. The network 106 can include computer networks such as the Internet, local, wide, metro or other area networks, intranets, and other computer networks such as voice or data mobile phone communication networks. The system 100 can also include at least one data processing system, such as a content selection system 108. The content selection system 108 can include at least one logic device such as a computing device having a data processor to communicate via the network 106, for instance with a resource server 104, a user device 110, and/or a third-party content server 102. The content selection system 108 can include one or more data processors, such as a content placement processor configured to process information and provide data to display one or more content items to the resource server 104 or the user device 110, and one or more databases configured to store data. The content selection system 108 can include a server, such as an advertisement server or otherwise.

The user device 110 can include one or more mobile computing devices such as a laptop, smart phone, tablet, and/or personal digital assistant device configured to communicate with other devices via the network 106. The computing device may be any form of portable electronic device that includes a data processor and a memory, i.e., a processing module. The processor may include a microprocessor, an application-specific integrated circuit (ASIC), a field-programmable gate array (FPGA), etc., or combinations thereof.

The memory may store machine instructions that, when executed by a processor, cause the processor to perform one or more of the operations described herein. The memory may also store data to display one or more resources, content items, etc. on the computing device. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, solid state drive, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language. The user device 110 can execute a software application (e.g., a web browser or other application) to retrieve content from other computing devices over network 106.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, application data, and other forms of electronic documents or data) to the user device 110. In one implementation, the user device 110 can access the resource server 104 via the network 106 to request data to display a resource of the resource server 104.

One or more third-party content providers may have third-party content servers 102 to directly, indirectly, or otherwise provide data for third-party content items to the content selection system 108 and/or to other computing devices via network 106. The content items may be in any format that may be presented on a display of a user device 110, for instance, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content selection system 108 and/or the data for the third-party content items may be stored in a database of the content selection system 108.

In one implementation, the content selection system 108 can receive, via the network 106, a request for a content item to present with a resource and/or an application (such as a mobile application). The received request may be received from a resource server 104, a user device 110 (e.g., a mobile device executing a mobile application, etc.), and/or any other computing device. The resource server 104 may be owned or ran by a first-party content provider that may have an agreement with the owner of the content selection system 108 for the system to provide third-party content items to present with one or more resources of the first-party content provider on the resource server 104. In one implementation, the resource may include a web page. In another implementation, an application may be developed by a first-party content provider that may have an agreement with the owner of the content selection system 108 for the system to provide third-party content items to present with the application of the first-party content provider.

The user device 110 may be a computing device operated by a user (represented by a device identifier), which, when accessing a resource of the resource server 104 and/or executing an application, can make a request to the content selection system 108 for content items to be presented with the resource and/or application, for instance. The content item request can include requesting device information (e.g., a web browser type, an operating system type, one or more previous resource requests from the requesting device, one or more previous content items accessed by the requesting device, a language setting for the requesting device, a time of a day at the requesting device, a day of a week at the requesting device, a day of a month at the requesting device, a day of a year at the requesting device, etc.) and resource and/or application information (e.g., a uniform resource locator (URL) of the requested resource, one or more keywords of the content of the requested resource, text of the content of the resource, a title of the resource, one or more keywords of the content of the application, text of the content of the application, a title of the application, etc.). The device information that the content selection system 108 receives can include a HyperText Transfer Protocol (HTTP) cookie which contains a device identifier (e.g., a random number, alphanumeric string, etc.) that represents the user device 110.

In some instances, device state data from the user device 110 may also be included, either as part of the content item request and/or separately. For instance, a resource from the resource server 104 may include coding, such as HTML5, JavaScript®, etc., that requests device state data from one or more device state indicators of the user device and returns the indicator data to the content selection system 108. In some instances, the indicator data may be incorporated into the content item request with the device information and/or resource information (such as appending a string of encoded indicator data to a URL request) or the indicator data may be transmitted to the content selection system 108 separately. The requesting device information, the resource information, and/or the indicator data may be utilized by the content selection system 108 to select third-party content items to be served with the requested resource and presented on a display of a user device.

A resource may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a user device 110. The search results may include web page titles, hyperlinks, etc. One or more third-party content items may also be presented with the search results in a content item slot of the search result web page. Accordingly, the resource server 104 and/or the user device 110 may request one or more content items from the content selection system 108 to be presented in the content item slot of the search result web page. The content item request may include additional information, such as a quantity of content items, a format for the content items, the search query string, keywords of the search query string, information related to the query (e.g., temporal information), etc. In some implementations, a delineation may be made between the search results and the third-party content items to avert confusion. The resource server 104 and/or user device 110 may transmit information regarding the selected content item to the content selection system 108, such as data indicating whether the content item was clicked on.

In some implementations, the third-party content provider may manage the selection and serving of content items by content selection system 108. For instance, the third-party content provider may set selection criteria via a user interface that may include one or more content item conditions or constraints regarding the serving of content items. A third-party content provider may specify that a content item and/or a set of content items should be selected and served for user devices 110 having device identifiers associated with a certain language, a certain operating system, a certain web browser, etc. In another instance, the third-party content provider may specify that a content item or set of content items should be selected and served when the resource, such as a web page, document, etc., contains content that matches or is related to certain keywords, phrases, etc. In other instances, the third-party content provider may specify that a content item or set of content items should be selected and served when particular sets of values for device state data is received. Of course, the third-party content provider may include other selection criteria as well. For instance, the third party-content provider may include selection criteria such as user device attributes including network speed, capabilities, processor speed, available RAM, and available storage.

Figure 2:
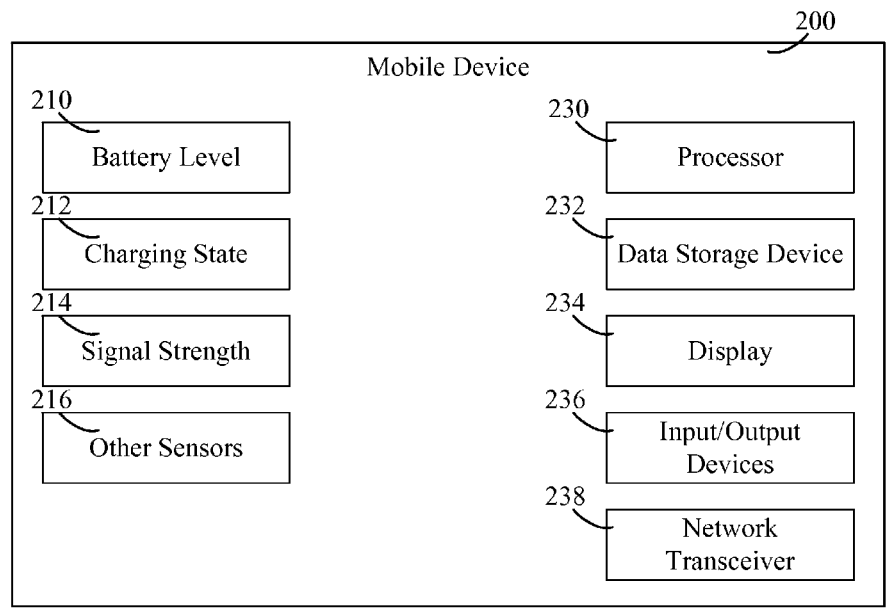
FIG. 2 is a block diagram of an implementation of a device having one or more detectors or indicators for determining a device state.

FIG. 2 is a block diagram of an implementation of a device 200, which may be a user device 110 of FIG. 1, having one or more device state indicators, a processor 230, a data storage device 232, a display 234, input/output devices 236, and a network transceiver 238. The device 200 may include a smartphone, a cellular telephone, a tablet, a laptop, a portable media device, a wearable display or glasses, and/or any other portable electronic device. The device 200 may include a bus or other communication component for communicating information between the various components of the device 200. The processor 230 or processor may be coupled to the bus and/or otherwise for processing information, data, and/or instructions from one or more components of the device 200. The data storage device 232 may include dynamic storage devices, such as a RAM or other dynamic storage devices, and may be coupled to the bus and/or otherwise for storing information, data, and/or instructions to be executed by the processor 230. The data storage device 232 can also be used for storing position information, temporary variables, and/or other intermediate information during execution of instructions by the processor 230. In some instances, the data storage device 232 may include a static storage device, in addition to or instead of the dynamic storage device, such as ROM, solid state drive (SSD), flash memory (e.g., EEPROM, EPROM, etc.), magnetic disc, optical disc, etc., that is coupled to the bus and/or otherwise for storing static information, data, and/or instructions for the processor 230.

The display 234 may be coupled via the bus and/or otherwise to other components of the device 200. The display may include a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. The input/output devices 236 may include devices such as a keyboard having alphanumeric and other keys, a microphone, a speaker, an LED, a trackball, a mouse, cursor direction keys, etc. that may be coupled to the bus for communicating information and/or command selections to the processor 230. In another implementation, an input device may be integrated with the display 234, such as in a touch screen display.

The network transceiver 238 may be configured to interface with a network, such as network 106 of FIG. 1. Such a network may include the Internet, local, wide, metro or other area networks, intranets, voice or data mobile device communication networks, and/or other networks. In one implementation, the network transceiver 238 may include voice and/or data mobile device communication network through which the device 200 may communicate with remote devices, such as third-party content server 120, resource server 104, and/or content selection system 108 of FIG. 1. The voice and/or data mobile device communication network may include those operating under the standards of GSM, EDGE, GPRS, CDMA, UMTS, WCDMA, HSPA, HSPA+, LTE, and/or other mobile device network standards. In some implementations, the network transceiver 238 may include other network transceivers, such as a WiFi™ transceiver, a Bluetooth® transceiver, a cellular transceiver, an NFC transceiver, etc. In still further implementations, the device 200 may include several network transceivers 238, such that the device 200 may communicate with several networks. Of course, other network transceivers 238 for the device 200 to communicate with remote devices may be used as well.

According to various implementations, the processor 230 may execute an arrangement of instructions contained in the data storage device 232. Such instructions can be read into the data storage device 232 from another computer-readable medium. Execution of the arrangement of instructions contained in the data storage device 232 may cause the device 200 to perform various operations, such as reading data output from one or more device state indicators, transmitting data to a remote device via the network transceiver 238, displaying information on the display 234, and/or otherwise. One or more processors in a multi-processing arrangement may also be employed to execute the instructions contained in the data storage device 232. In alternative implementations, hard-wired circuitry may be used in place of or in combination with software instructions to effect the various operations. Thus, implementations are not limited to any specific combination of hardware circuitry and software. Of course, other configurations or components for device 200 may be included.

The several device state indicators may include a battery level indicator 210, a charging state indicator 212, a signal strength indicator 214, and/or other indicators and/or sensors 216. Of course device 200 may have other features, components, etc. as well. In the present implementation, battery level indicator 210 may be communicatively coupled to the processor 230, the data storage device 232, the display 234, the input/output devices 236, the network transceiver 238, and/or other components of the device 200. A value indicative of a battery level of the device 200 may be output to the processor 230, the data storage device 232, the network transceiver 238, and/or any other component of the device 200.

The charging state indicator 212 may be communicatively coupled to the processor 230, the data storage device 232, the display 234, the input/output devices 236, the network transceiver 238, and/or other components of the device 200. A value indicative of the charging state of the device 200 may be output to the processor 230, the data storage device 232, the network transceiver 238, and/or any other component of the device 200.

The signal strength indicator 214 may be communicatively coupled to the processor 230, the data storage device 232, the display 234, the input/output devices 236, the network transceiver 238, and/or other components of the device 200. A value indicative of the signal strength of the device 200 may be output to the processor 230, the data storage device 232, the network transceiver 238, and/or any other component of device 200.

While the foregoing describes aspects that may be included in the device 200, other indicators and/or sensors 216 may be included in addition to the aforementioned device state indicators, such as atmospheric sensors, fluid velocity sensors, force sensors, gyroscopic sensors, magnetometers, light sensors, proximity sensors, barometric sensors, temperature sensors, humidity sensors, accelerometers, MEMS sensors, etc.

In some implementations, the device state, which may include values indicative of the battery level, signal strength, charging, state and/or other indicators or sensors, may be transmitted via the network transceiver 238 in response to receiving data via the network transceiver 238. For instance, the device 200 may request a resource, such as a mobile webpage, by sending the request for data for the resource to a resource server, such as resource server 104, via the network transceiver 238. The resource server may receive the request and provide data to display the resource on the display 234 of the device 200. The data for the resource may include one or more content item slots for displaying one or more third-party content items when the resource is presented for display by the device 200. In some implementations, the data for the requested resource may include code or a piece of code, such as a JavaScript® script, that may cause the processor 230 of the device 200 to determine one or more values indicative of the battery level, signal strength, charging, state and/or several other indicators or sensors of the device 200 and transmit the one or more values to a remote device, such as content selection system 108, via the network transceiver 238. In some instances, the one or more values indicative of the battery level, signal strength, charging, state and/or sensors of the device 200 may be appended to a content item request URL (e.g., contentitem.item/page/contentitem?party=abc123&battlvl=5&sigstr=7&sensor3=45 or contentitem.item/page/contentitem?party=abc123&devicestate=98765). Thus, one or more of the several device state indicators of the device 200 may have the current values read and transmitted to a content selection system. Such values may be used by the content selection system to select a content item to be served with the requested resource.

In another implementation, the values indicative of the battery level, signal strength, charging, state and/or other sensors may be transmitted via the network transceiver 238 in response to executing a mobile application on the device 200. For instance, a mobile application may include a content item slot for presenting third-party content items while the mobile application is being executed. The mobile application may include instructions that cause the processor 230 of the device 200 to transmit the values indicative of the battery level, signal strength, charging, state and/or other sensors to a remote device, such as content selection system 108, via the network transceiver 238. The one or more values from the one or more device state indicators of the device 200 may be appended to a content item request URL (e.g., contentitem.item/page/contentitem?party=abc123&battlvl=5&sigstr=7&sensor3=45 or contentitem.item/page/contentitem?party=abc123&devicestate=98765). Such values may be used by the content selection system to select a content item to be served while the mobile application is executing on the device 200. In some instances, the mobile application may repeatedly cause the processor 230 of the device 200 to transmit the values indicative of the battery level, signal strength, charging, state and/or other sensors to select and serve several third-party content items. The mobile application may include instructions to read and transmit the values after a predetermined period of time (e.g., every 30 seconds, every 1 minute, every 2 minutes, every 5 minutes, etc.), after the occurrence of an event, and/or on demand.

Figure 3:
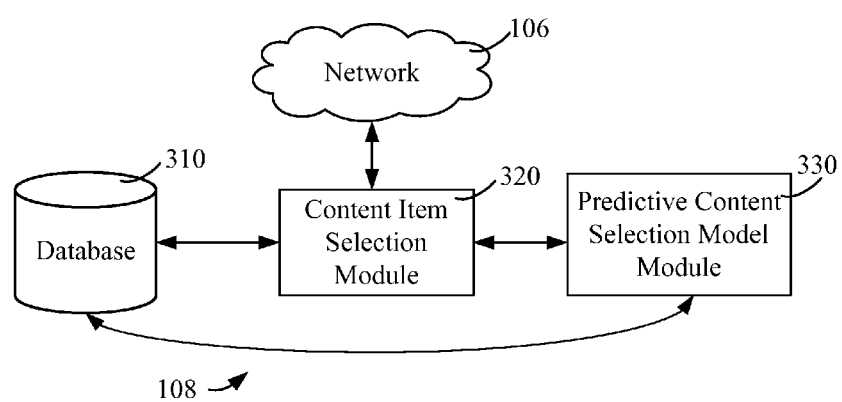
FIG. 3 is a block diagram of an implementation of a system for selecting content items using a predictive model.

FIG. 3 is a block diagram of an implementation of a portion of the content selection system 108 for selecting and serving content items. In such an instance, the content selection system 108 may include a database 310, a content item selection module 320, and a predictive model module 330. The database 310 may store data for and/or provide data to the content item selection module 320 and/or the predictive model module 330. The database 310 may include a static storage device, such as ROM, solid state drive (SSD), flash memory (e.g., EEPROM, EPROM, etc.), magnetic disc, optical disc, etc., a plurality of static storage devices, a cloud storage system, a server, and/or any other electronic device capable of storing and providing data. The data stored in the database 310 may include data to display the content item, CTR values, CVR values, detector data from one or more detectors and/or from one or more devices, historical detector data, sequences of served content items, impression counts, content item slot positions, numbers of content items in a content item slot, winning bids, selection criteria, format types, keywords, languages, times of a day, days of a week, days of a month, days of a year, and/or any other data.

In some instances, the data may be related to a parameter of a selected and served content item. For instance, data for content item slot positions may be related to what positions in a content item slot a particular content item has been shown. Such data may be used to filter response data across a number of content items such that the content item slot position is the same for the response data for each content item. Accordingly, the response data used to determine a predictive model, as will be described below, may filter out aspects that may affect the response data. For instance, a content item shown in a top position of a content item slot may be selected more often than a content item shown in a lower position of a content item slot. Accordingly, the response data may be filtered such that a first response for a content item shown in the top position may be used with other responses for the content item shown in the top position.

In the present implementation, database 310 includes one or more values of device state data from one or more device state indicators and/or from one or more devices. In some instances, the values of device state indicator data for a device may be stored as a set of values. The device state data for a device may include data indicative of the battery level, signal strength, charging, state and/or other sensor data, collectively referred to as device state data for a device, such as device 200.

In some instances, the collected data may be associated with data indicating whether a content item has been clicked on or not, such as response data. The response data may be any form of response data that may be useful for determining a content selection model. For instance, the response data may be data indicating whether a content item was clicked (e.g., a 1 if the content item was clicked and a 0 if not), whether a conversion occurred (e.g., a 1 if the selection and serving of the content item resulted in a sale and a 0 if not), etc. Thus, the database 310 may include a set of device state data and a set of response data associated with the set of device state data. As will be discussed in greater detail below, such response data and sets of device state data may be used in determining and/or using a content selection model.

The content item selection module 320 may be in communication with the network 106 and may be configured to select one or more content items to be served with a resource and/or an application. In some instances, the content item selection module 320 may perform an auction to select the one or more content items. For instance, the content item selection module 320 may select one or more content items of one or more third-party content providers based, at least in part, on output from the predictive content selection model module 230. The selection of the one or more content items may be further based on a bid of one or more third-party content providers for the one or more content items. Although the predictive model module 330 is shown separate from the content item selection module 320, in some implementations, the predictive model module 330 may be part of the content item selection module 320.

As will be described in greater detail below, the predictive model module 330 may output one or more values that may be used by the content item selection module 320 to select a content item based on a predictive model. For instance, the predictive model may be generated and/or updated using historical device state data associated with historical response data, which may be stored in database 310. Such a predictive model may be trained via machine learning algorithms. The predictive model may output a predicted response data value (e.g., pCTR, pCVR, etc.) when provided with values of device state data as an input to the predictive model. For instance, a particular content item may have a higher historical CTR value when values of device state data indicates a given battery level for the content item in particular circumstances (e.g., a low-energy-consumption content item related to a metro or subway may be clicked on more often when device state data indicates that a device is currently on the metro or subway and/or has historically been on the metro or subway and the battery level of the device is low). The predictive model may be generated and/or updated based on a number of historical device state data sets and historical response data (e.g., whether the content item was clicked on) to provide an output value indicating that the content item has a higher predicted CTR value when subsequent data from a device indicates similar circumstances. Of course, other implementations and/or outputs using the content selection model may be provided.

Figure 4:
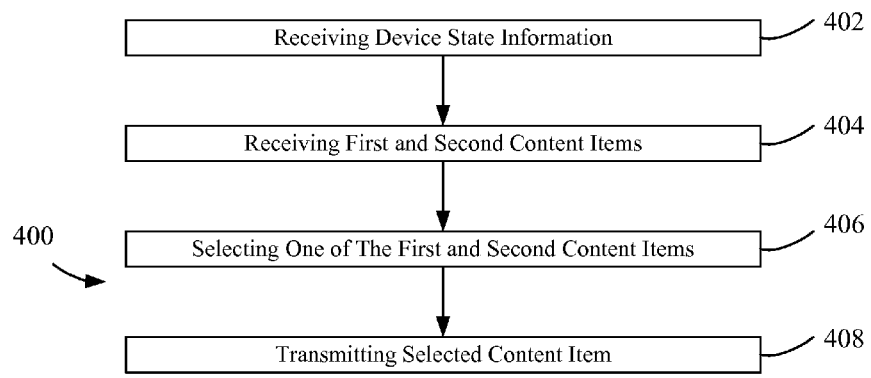
FIG. 4 is a flow diagram of an implementation of a method for selecting and serving a content item based on a battery level.

FIG. 4 is a flow diagram of an implementation of a method 400 for selecting between two content items based on received device state data or information. As mentioned above, the device state information includes at least one of battery level data, signal strength data, and charging state information. The method 400 includes receiving device state information (block 402). The device state information may be included with a content item request or may be received separately from the content item request. For instance, the device state information may be appended as one or more parameters to a content item request URL.

The method 400 further includes accessing a first content item and a second content item (block 404). The first content item and the second content item may be selected from several content items based on the responsiveness of the first content item and the second content item to the content item request. For instance, when a search is performed for a term "cars," a first content item and a second content item that are each associated with the keyword "car" may be selected and accessed as candidate content items to be served responsive to the content item request. In some instances, the content is accessed via receipt at one or more data processors.

The method 400 includes, upon receipt of both the first and the second content items, selection of one of the first content item or the second content item (block 406). The selection may be made based at least in part on the device state information. For instance, if the device state information includes data indicative of a battery level below 10% and the first content item is a rich media content item having a high battery consumption level and the second content item is a text content item having a low battery consumption level, the second content item may be selected responsive to the content item request. In another instance, if the device state information includes data indicative of a low signal strength and the first content item is a video streaming content item needing a high signal strength to display the video and the second content item is a text content item needing only a low signal strength to display the text, the second content item may be selected responsive to the content item request. In yet a further implementation, if the device state information includes data indicative of a plugged-in charging state and the first content item is a rich media content item having a high battery consumption level and the second content item is a text content item having a low battery consumption level, then the first content item may be selected responsive to the content item request regardless of data indicative of the battery level.

Further, following the selection of one of the first content item and the second content item, the method 400 includes providing the selected content item for display on the user device (block 408).

Figure 5:
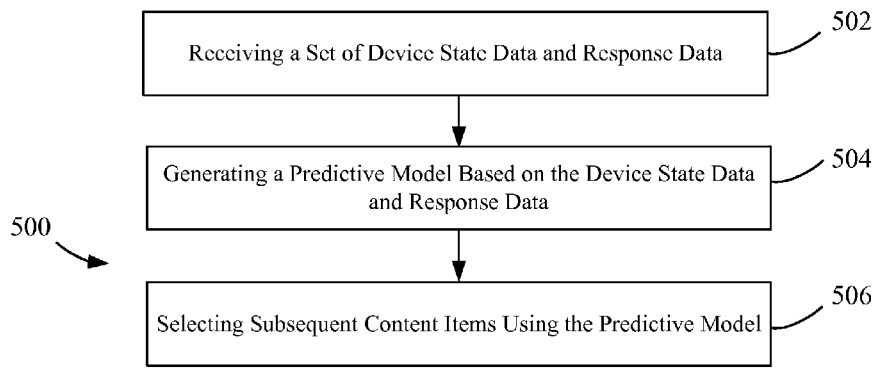
FIG. 5 is a flow diagram of an implementation of a method for selecting and serving content items and receiving response data.

FIG. 5 is a flow diagram of an implementation of a method 500 for determining a predictive model to output a value based on device state data. The method 500 may include receiving a set of device state data, such as battery level, signal strength, and/or charging state data, and associated response data (block 502). The response data may be any form of response data that may be useful for determining a predictive model. For instance, the response data may be data indicating whether a content item was clicked (e.g., a 1 if the content item was clicked and a 0 if not), whether a conversion occurred (e.g., a 1 if the selection and serving of the content item resulted in a sale and a 0 if not), etc.

The set of device state data may include several sets of device state indicator data (e.g., battery level, signal strength, and/or charging state data) received from several different devices. The sets of device state indicator data may each include a set of values representing values outputted from device state indicators from the respective devices. In some instances, the values may be bucketized values as described below. In some implementations, the received set of device state data and the response data may be associated with a content item of a set of content items.

Using the set of device state data and the response data, a predictive model may be generated (block 504). For instance, CTR values, as determined by the response data, for a certain content item may be determined to be lower for certain battery levels. Thus, the determined predictive model may output a lower predicted CTR value when the battery is at a particular level. In other instances, a CTR value may be lower for a rich media content item when the signal strength data indicates a low signal strength, so the predictive model may be trained to output a lower predicted CTR value when data indicative of a low signal strength is input into the predictive model. Of course, entire device state may be used to generate the predictive model.

In some instances, the predictive model may be determined for a group or category of content items. For instance, the predictive model may be determined based on sets of device state data and response data associated with a group or category of content items (e.g., a predictive model for text content items, rich media content items, Flash® animation content items, campaign groups of content items, etc.). Such a predictive model may be used to output predicted CTR, CVR, or other values for groups or categories of content items that may be used in the selection of a group or category of content items. The predictive model may be used to subsequently select and serve a content item (block 506).

Figure 6:
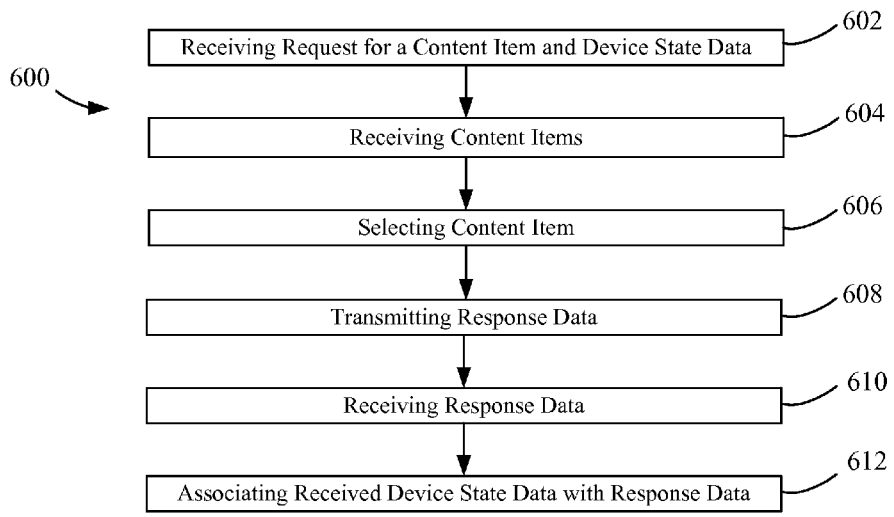
FIG. 6 is a flow diagram of an implementation of a method for generating a predictive model using device state information.

FIG. 6 is a flow diagram of an implementation of a method 500 for selection and serving content items to one or more devices and receiving response data. A request for a content item may be received (block 602) by a content selection system, such as content selection system 108 of FIG. 1. Data indicating a battery level, signal strength, and/or charging state may also be received (block 602). The content item request may be received from a resource server, a mobile device, a user device, and/or otherwise. The request for a content item may include parameters such as a search query string, a keyword, a language, a time of a day, a day of a week, a day of a month, a day of a year, a resource domain, a browser type, an operating system type, a content item slot position, a number of content items to be presented in a content item slot, and/or any other parameter that may be associated with a request for a content item. Such parameters may be used in the selection and serving of a content item by the content selection system.

Following receipt of the request for the content item and the device state data, several candidate content items may be determined (block 604) responsive to the request for a content item. The several candidate content items may be determined based on selection criteria associated with each of the several candidate content items and the received content item request. A content item from the several candidate content items is selected responsive to the content item request (block 606). The selected content item may be selected based, at least in part, on a value output from a predictive model that uses the device state data as an input. For instance, one or more predictive models may be used to generate a value that can be used to modify a bid associated with a content item based on the device state data. In some implementations, the value output from the predictive model may be a pCTR value that predicts the click-through-rate for the content item based on the device state data. The pCTR value may be used to modify a bid associated with the content item. Accordingly, if a content item has a high bid value but a very low pCTR value (e.g., a rich media content item when a low battery level is indicated), then the content item may not be selected when an auction is performed where a second content item has a higher pCTR value, but a lower bid (e.g., a text content item when the low battery level is indicated). In some implementations, the resulting values associated with each content item may be ranked or sorted and the highest scoring content item may be selected to be served.

In some implementations, the selected content item may be a content item intended to comport with the context in which it appears. More specifically, the selected content item may have common attributes with the medium in which it is displayed, such as commonality with respect to aesthetics, content, and functionality. The selected content item of some implementations may be an audiovisual item, article, image, or plain text, or may have other formats. Such content items may be 'native formats' associated with particular brand experiences, e.g., sponsored or promoted items.

In other implementations, the device state data may be used to filter one or more content items from the several content items. For instance, if a third-party content provider prefers to not serve a content item when a battery level of a device is below a predetermined level (e.g., below 10%), then the value for the content item may be set to 0 to prevent the content item from being selected. In other implementations, an alternative content item of the content item provider may be selected (e.g., a corresponding text content item of the content item provider may be selected instead of a rich media content item).

Data to display a selected content item may be provided (block 608) in response to the request for a content item. The data to display the selected content item may be provided by transmission via a voice and/or data device communication network operating under the standards of GSM, EDGE, GPRS, CDMA, UMTS, WCDMA, HSPA, HSPA+, LTE, and/or other mobile device network standards. In some implementations, the data to display the selected content item and the code may be transmitted via WiFi™, Bluetooth®, NFC, and/or otherwise.

Response data may be received and stored by the content selection system (block 610). For instance, response data may be received when the served content item is selected, when a conversion occurs, and/or when any other event is performed. For instance, a JavaScript® script may transmit a first value, e.g., a click identifier, if the served content item is selected by a user of the device. In some implementations, if no click identifier is received, then the absence of the click identifier may be indicative of the served content item not being selected. In other implementations, a second value may be transmitted if the served content item is not selected. A script may determine that the content item is not selected if a predetermined period of time elapses without a selection and/or if the content item is no long displayed (e.g., by a user navigating away from a webpage, by terminating the execution of an application, etc.). In some instances, the script may transmit the response data to the content selection system by causing a processor of the device to transmit the response data via a network transceiver.

The received set of device state data may be associated with the received response data (block 612), such as by the content selection system. For instance, the received set of values of device state data and the received response data may be stored together and associated in a device state history, a log, and/or other data file in a database and/or otherwise. In some implementations, the received set of values of device state data and the received response data may be further associated with the served content item (e.g., by an identifier of the served content item or otherwise), with a category or group of the served content item (e.g., by an identifier of a category or group of the served content item or otherwise), with similar sets of device state data having similar values of other devices (e.g., by an identifier for an aggregate grouping of similar data), and/or with otherwise. The received set of values of device state data and the received response data may be used in the determining of a predictive model.

In some instances, the device state data may be bucketized (e.g., utilizing a value representative of a range of discrete values). For instance, the values of battery level, signal strength, and/or charging state may first associated with a remaining battery time before a battery is drained, and the time increments can be bucketized into 15 minutes of battery remaining, between 15 minutes and half an hour of battery remaining, inclusive, between half an hour and 45 minutes remaining, inclusive, and between 45 minutes and one hour remaining, inclusive. Of course the foregoing is merely an illustrative implementation and other ranges may be used and/or other levels of abstraction may be implemented. Moreover, in some instances, machine learning algorithms may be used to determine the ranges for the various device state data for abstraction. For instance, it may be determined that very few users would ever be receptive to content when they have only 5 minutes of battery life remaining. An end range or bucket for battery level may be set accordingly.

In some implementations, in addition to or instead of the battery level data, values relating to signal strength may be bucketized by dBm. Similarly, the charging state can be used in conjunction with the battery level, or instead of the battery level, for bucketizing into buckets such as "Charging," "Full," "Discharging," etc. In some implementations, the charging state can combined with the battery level data for bucketizing into categories such as "Charging—10% Charged," "Charging—20% Charged," "Charging—20-50% Charged," "Charging—80+% Charged." Such a correlation may be utilized in determining whether to provide third-party content of a high battery consumption type when the battery of the user device is still charging but almost completely charged.

Figure 7:
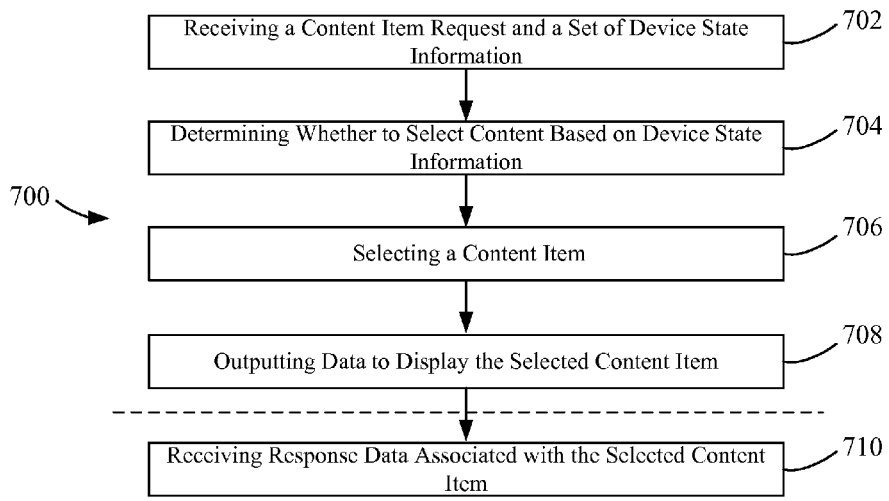
FIG. 7 is a flow diagram of an implementation of a method for selecting and serving a content item using a generated predictive model and a received device state.

FIG. 7 depicts a flow diagram of an implementation of a method 700 for selecting content items using a predictive model. The method 700 may include receiving a content item request and a set of device state information or data (block 702). The first content item request may be received by a data processor of a content selection system from a resource server, a user device, a mobile device, and/or otherwise. The first set of device state data may include several values from respective device state indicators of a device, such as the device state indicators of device 200, and including at least battery level data for the user device. The data may also include signal strength data and/or charging state data, and may further include data indicative of one of a network speed, a device capability level, a processor speed, an available RAM level, or an amount of available storage.

Next, the method includes determining, based on the received set of data, whether to select content based on device state data such as the battery level, and/or the signal strength data and charging state data (block 704). If the battery level is high, for instance, then the battery level need not be taken into further consideration in selecting content. On the other hand, if the battery level is low, then the method may include filtering, as described above, or other techniques so as to ensure selection of a low-consumption content item. Analogously, if the signal strength is strong and the battery level is high, these factors need not be further accounted for in selecting a content item. On the other hand, if the charging state data indicates that the user device is not charged and the battery is low, then the method may include filtering and selection of an appropriate low-consumption content item. In some circumstances, if the signal strength is extremely weak and the battery level is low, only a very low-consumption content item (if any) may be displayed.

A content item may be selected based, at least in part, on a predictive model that outputs a value for each content item of several candidate content items (block 706). The predictive model may output a value, such as a pCTR, pCVR, etc., based on the received set of device state data having a first set of values indicative of a battery level, a signal strength, a charging state, and/or other device state. The predictive model may be determined and/or trained in accordance with the methods described herein and/or otherwise. In some instances, the predictive model may be selected from several predictive models, such as a predictive model for a specific content item, a group or category of content items, and/or otherwise. For each content item, an output value from the predictive model may be determined. For instance, the output value may be a pCTR value, a pCVR value, and/or other value for the content item based on the received device state data having a set of values. In some implementations, the content item with the highest output value, as determined by the predictive model, may be selected. In some other implementations, the output values from the predictive model for each content item may be used in further determinations for which content item should be selected (e.g., in an auction of content items, etc.). For instance, a content provider may have a higher bid value for a content item for certain values of the device state data (e.g., those indicating a certain battery level) and a lower bid value for other values of the device state data. Accordingly, the third-party content provider may provide various bid amounts for various values of the device state data and/or for various battery levels. In some implementations, the third-party content provider may opt to ignore battery level data in selecting third-party content.

Data to display the selected content item may be outputted (block 708) such that the selected content item may be presented on a display of the device with a resource, such as a requested mobile webpage and/or a mobile application. In some implementations, the method 700 may end with the presentation of the selected content item (as noted by the dashed line).

In some implementations, the selected content item may be a low-energy consumption content item or the selected content item may be a high-energy consumption content item. In some implementations, the selected content item may be one of a click-to-download content item, an image content item, an interactive media content item, a Flash content item, an audio content item, a video content item, a banner content item, or a text content item. In some implementations, the selected content item may include more than one of a click-to-download content item, an image content item, an interactive media content item, a Flash content item, an audio content item, a video content item, a banner content item, or a text content item.

In other implementations, the method 700 may receive response data associated with the selected content item (block 710). For instance, response data may be received that is indicative of whether the served content item is selected, whether a conversion occurs, and/or when any other event is performed. For instance, a JavaScript® script may transmit a first value, e.g., a click identifier, if the served content item is selected by a user of the device. In some implementations, if no click identifier is received, then the absence of the click identifier may be indicative of the served content item not being selected. In other implementations, a second value may be transmitted if the served content item is not selected. A script may determine that the content item is not selected if a predetermined period of time elapses without a selection and/or if the content item is no long displayed (e.g., by a user navigating away from a webpage, by terminating the execution of an application, etc.). A script may transmit the response data to the content selection system, such as content selection system 108, by causing a processor of the device to transmit the response data via a network transceiver of the device. The received response data may be associated with the device state data and the selected content item and stored in a database, such as database 310.

Further, in some implementations, the predictive model may be updated using the received response data. For instance, the predictive model may be updated via the determining and/or training of the method 600 described herein and/or otherwise. The received response data may be associated with the device state data and combined with a number of historical device state data sets and historical response data, such as that stored in a database, to be used in updating the predictive model. Accordingly, the predictive model may be updated for subsequent device state data and response data. The predictive model may be a predictive model for a specific content item, a group or category of content items, and/or otherwise. In some implementations, the method 700 may end with the update of the predictive model.

Figure 8:
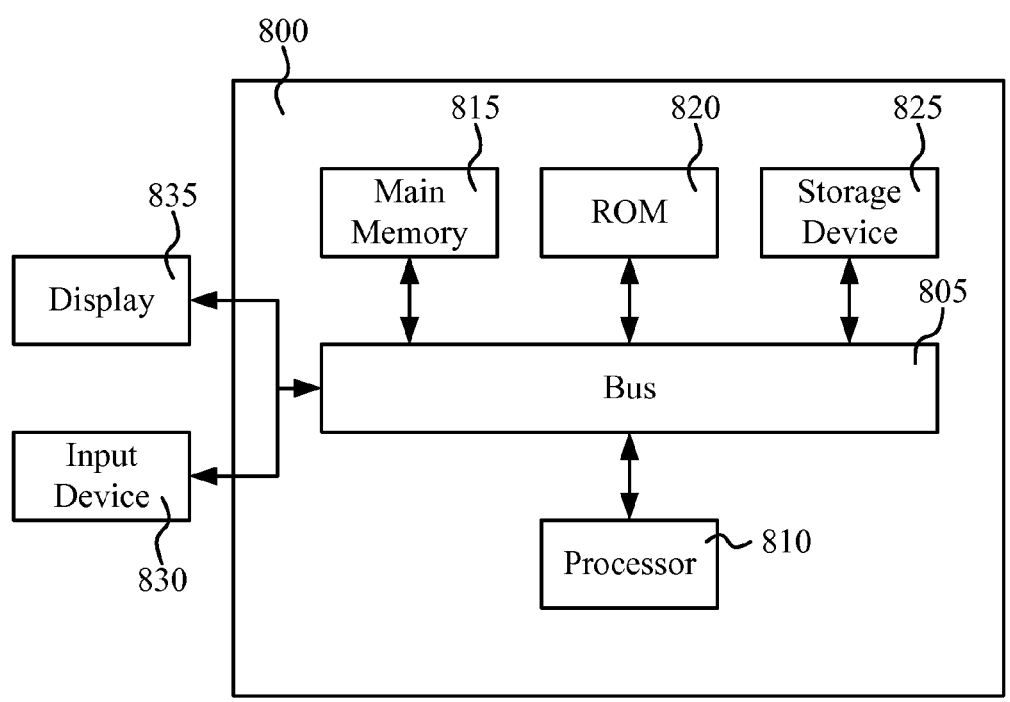
FIG. 8 is a block diagram illustrating a general architecture for a computer system that may be employed to implement various elements of the systems and methods described and illustrated herein.

FIG. 8 is a block diagram of a computer system 800 that can be used to implement the resource server 104, user device 110, content selection system 108, third-party content server 102, etc. The computing system 800 includes a bus 805 or other communication component for communicating information and a processor 810 or processing module coupled to the bus 805 for processing information. The computing system 800 can also include one or more processors 810 or processing modules coupled to the bus for processing information. The computing system 800 also includes main memory 815, such as a RAM or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a ROM 820 or other static storage device coupled to the bus 805 for storing static information and instructions for the processor 810. A storage device 825, such as a solid state device, magnetic disk or optical disk, is coupled to the bus 805 for persistently storing information and instructions. Computing device 800 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 800 may be coupled via the bus 805 to a display 835, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 830, such as a keyboard including alphanumeric and other keys, may be coupled to the bus 805 for communicating information and command selections to the processor 810. In another implementation, the input device 830 may be integrated with the display 835, such as in a touch screen display. The input device 830 can include a cursor control, such as a mouse, a trackball, or cursor direction keys, for communicating direction information and command selections to the processor 810 and for controlling cursor movement on the display 835.

According to various implementations, the processes and/or methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes and/or method steps described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an implementation of a computing system 800 has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including a programmable processor, a computer, a system on a chip, or multiple ones, a portion of a programmed processor, or combinations of the foregoing, for instance. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, for instance, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD disks, for instance. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for instance, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for selecting and serving content items comprising:
   receiving, at one or more server data processors of at least one server, data indicative of a battery level of a battery of a mobile device and a request for a content item to be displayed on a display of the mobile device;
   identifying, at the one or more server data processors of the at least one server and responsive to the request for a content item, a first content item associated with a first energy consumption level corresponding to a first energy amount consumed to display the first content item and a second content item associated with a second energy consumption level, the first energy amount higher than the second energy amount;
   determining, using the one or more server data processors of the at least one server, that the received data indicative of the battery level of the battery of the mobile device is below a predetermined threshold;
   selecting, using the one or more server data processors of the at least one server, the second content item responsive to determining that the received data indicative of the battery level of the battery of the mobile device is below the predetermined threshold; and
   providing, using the one or more server data processors of the at least one server and for display at the mobile device, the second content item to the mobile device to display the second content item on the display of the mobile device.

2. The method of claim 1, wherein receiving the request for a content item includes a first request and further comprising:
   receiving, at the one or more server data processors of the at least one server, a second request for a content item;
   receiving, at the one or more server data processors of the at least one server, data indicative of a charging state of the mobile device;
   determining, using the one or more server data processors of the at least one server, that the received data is indicative of the battery level of the battery of the mobile device is above a predetermined threshold or indicative of a charging state of the mobile device;
   selecting the first content item responsive to determining that the received data is indicative of the battery level of the battery of the mobile device is above a predetermined threshold or that the charging state indicating connection of the mobile device to a power source other than the battery of the mobile device; and
providing, using the one or more server data processors of the at least one server and for display at the mobile device, the first content item to the mobile device.

3. The method of claim 2, wherein the first content item is associated with selection criteria to not be served when a determined battery level of the battery is below the predetermined threshold.

4. The method of claim 1, further comprising:
receiving, at the one or more server data processors of the at least one server, data indicative of a signal strength of the mobile device;
wherein the selecting is further based, at least in part, on the determined signal strength of the mobile device.

5. The method of claim 1, wherein the first content item comprises one of a click-to-download content item, an image content item, an interactive media content item, a Flash content item, an audio content item, or a video content item, and wherein the second content item comprises a text content item.

6. The method of claim 1, further comprising:
filtering a plurality of content items associated with an energy consumption level higher than the predetermined threshold based, at least in part, on the received data indicative of the battery level of the battery of the mobile device.

7. The method of claim 1, wherein the received data further comprises data indicative of one of a network speed of the mobile device, a device capability level of the mobile device, a processor speed, an available RAM level of the mobile device, or an amount of available storage of the mobile device.

8. A system configured to display a content item on a mobile device, the system comprising:
one or more server data processors of at least one server; and a computer-readable storage device storing instructions that, when executed by the one or more server data processors, cause the one or more server data processors to perform operations comprising:
receiving, at the one or more server data processors of the at least one server, a request for a content item to be displayed on a display of the mobile device, data indicative of a battery level of a battery of the mobile device, and at least one of a signal strength of the mobile device or a charging state of the mobile device;
identifying, at the one or more server data processors of the at least one server and from among a plurality of candidate content items and responsive to the request for a content item, a first content item and a second content item, the first content item associated with a first energy consumption level corresponding to a first energy amount consumed to display the first content item, the second content item associated with a second energy consumption level, the first energy amount higher than the second energy amount;
determining, using the one or more server data processors of the at least one server, that the received data indicative of the battery level of the battery of the mobile device is below a predetermined threshold;
selecting, using the one or more server data processors of the at least one server, the second content item responsive to determining that the received data indicative of the battery level of the battery of the mobile device is below the predetermined threshold; and
providing, using the one or more server data processors of the at least one server, the second content item to the mobile device to display the second content item on the display of the mobile device.

9. The system of claim 8, wherein the first content item is associated with downloadable content.

10. The system of claim 9, wherein the first content item is selected responsive to the battery level of the battery exceeding the predetermined threshold.

11. The system of claim 8, wherein the first content item comprises at least one of an audio content item or a visual content item, and the second content item is a text content item.

12. The system of claim 8, wherein the operations further comprise:
filtering a plurality of content items associated with an energy consumption level higher than the predetermined threshold based, at least in part, on the determined battery level of the battery of the device.

13. The system of claim 8, wherein the received data is indicative of the charging state and wherein the first content item is selected responsive to the charging state of the mobile device indicating connection of the mobile device to a power source other than the battery of the mobile device.

14. A non-transitory computer-readable storage medium having instructions that, when executed by one or more server data processors of at least one server, cause the one or more server data processors of the at least one server to perform operations comprising:
receiving, at the one or more server data processors of the at least one server, data indicative of a battery level of a battery of a mobile device and a request for a content item to be displayed on a display of the mobile device;
identifying, at the one or more server data processors of the at least one server, a plurality of content items responsive to the request for a content item;
determining, using the one or more server data processors of the at least one server and for each of the plurality of content items, a value based, at least in part, on a predictive model and the battery level of the battery of the mobile device, the value of the content item corresponding to the amount of energy consumed to display the content item;
selecting, using the one or more server data processors of the at least one server, a content item of the plurality of content items responsive to determining that the value of the content item is below the predetermined threshold; and
providing, using the one or more server data processors of the at least one server, the selected content item of the plurality of content items to the mobile device to display the selected content item on the display of the mobile device.

15. The non-transitory computer-readable storage medium of claim 14, wherein the plurality of content items comprise one or more of a click-to-download content item, a rich media content item, an image content item, or a text content item.

16. The non-transitory computer-readable storage medium of claim 14, having instructions that cause the one or more server data processors of the at least one server to perform operations further comprising:
receiving, at one or more server data processors, data indicative of a signal strength of the mobile device;

wherein the determined value is further based, at least in part, on the determined signal strength of the mobile device.

17. The non-transitory computer-readable storage medium of claim 16, wherein a first content item of the plurality of content items is a low-energy consumption content item and a second content item of the plurality of content items is a high-energy consumption content item.

\* \* \* \* \*